Oct. 2, 1928.
H. RICHARDSON ET AL
1,686,502
AUTOMATIC WEIGHING MACHINE
Filed Oct. 30, 1926    8 Sheets-Sheet 3
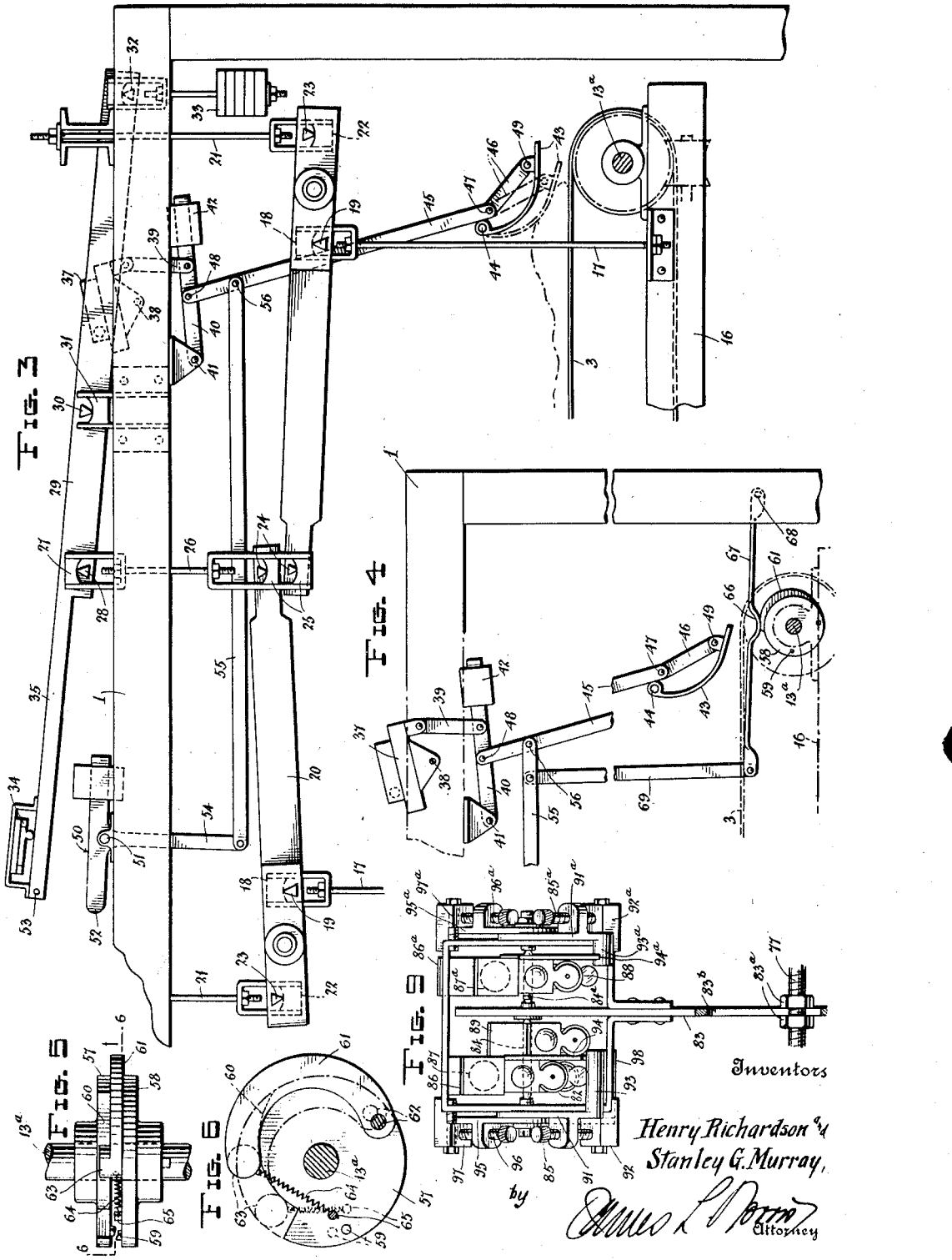

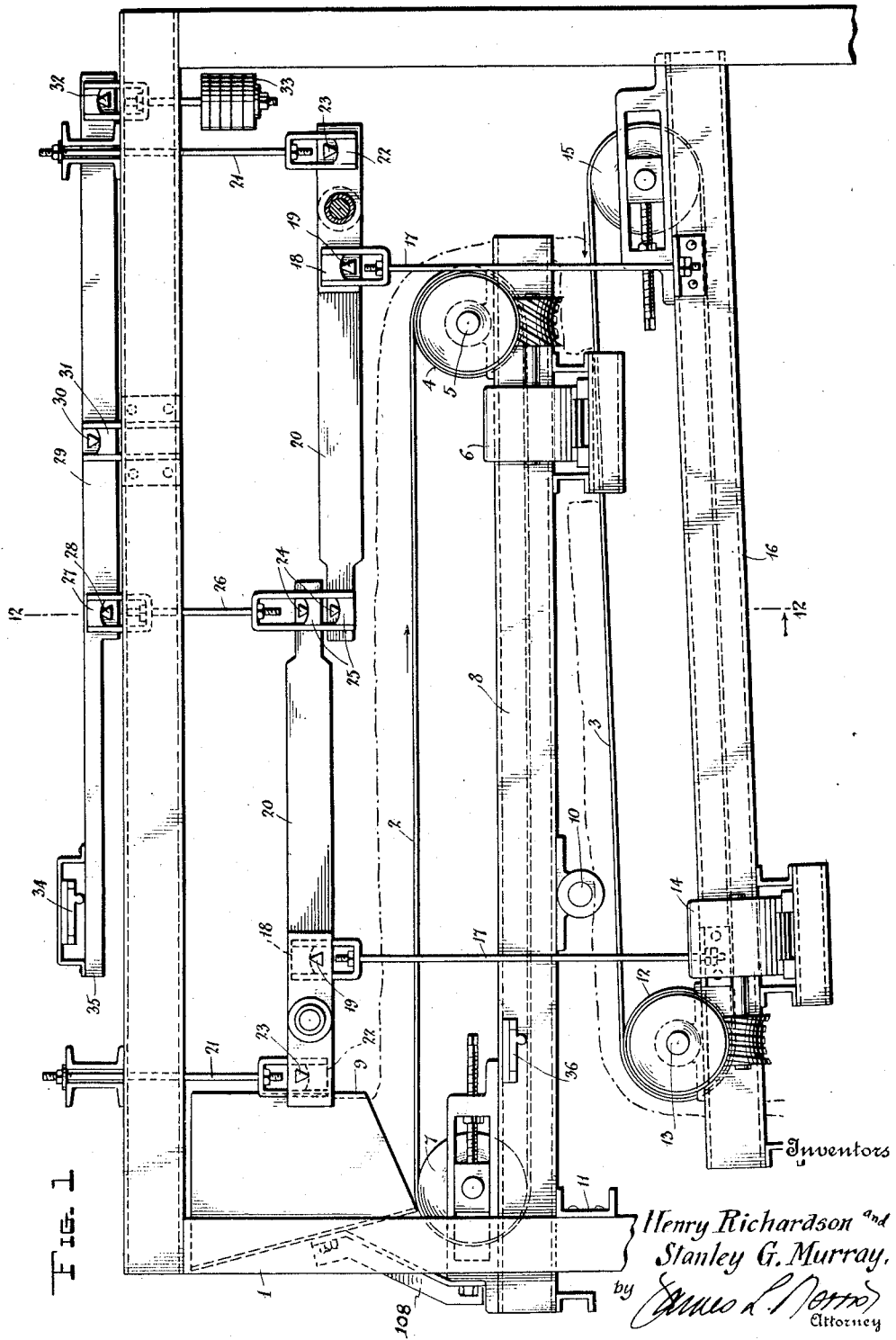

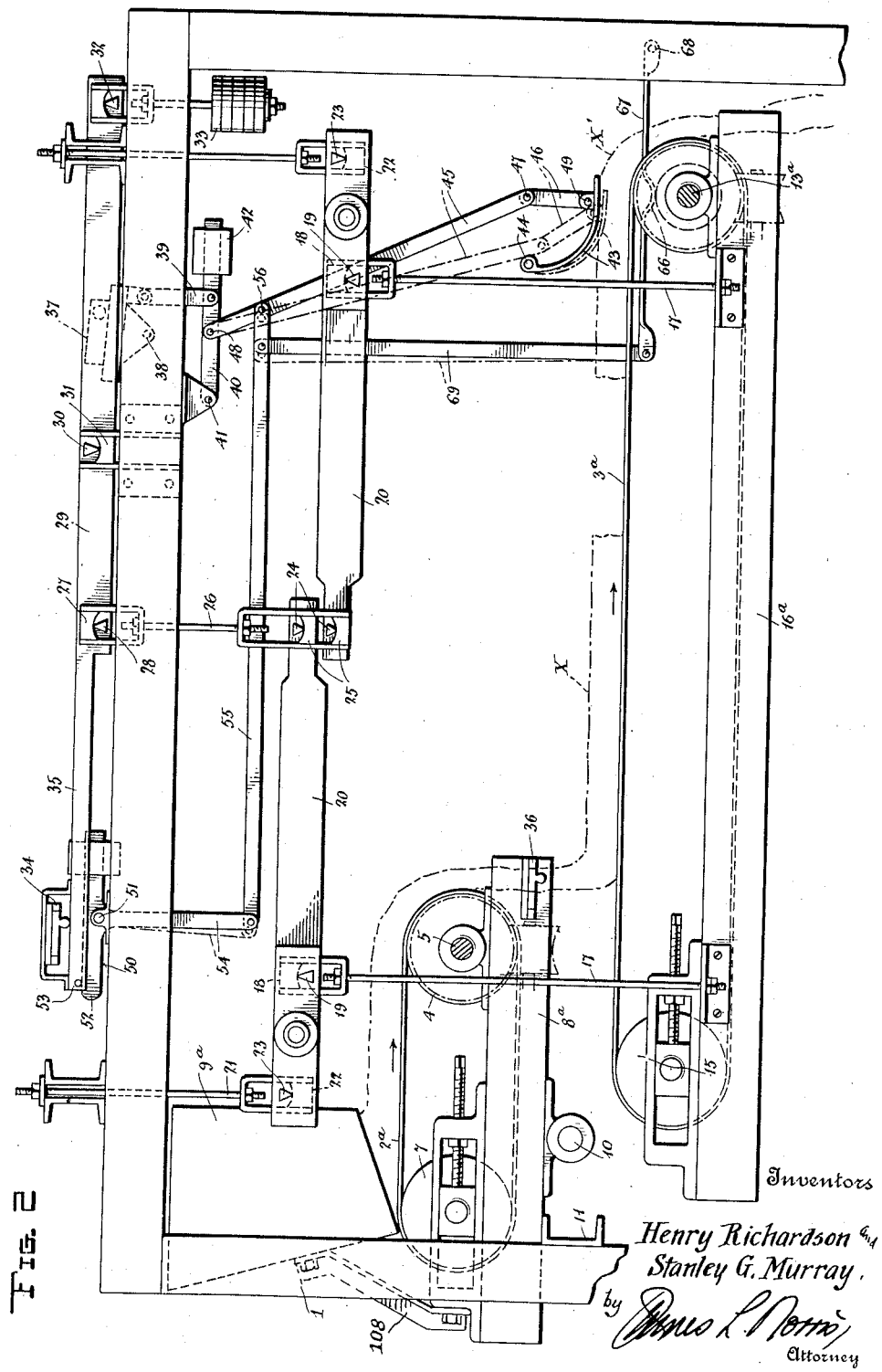

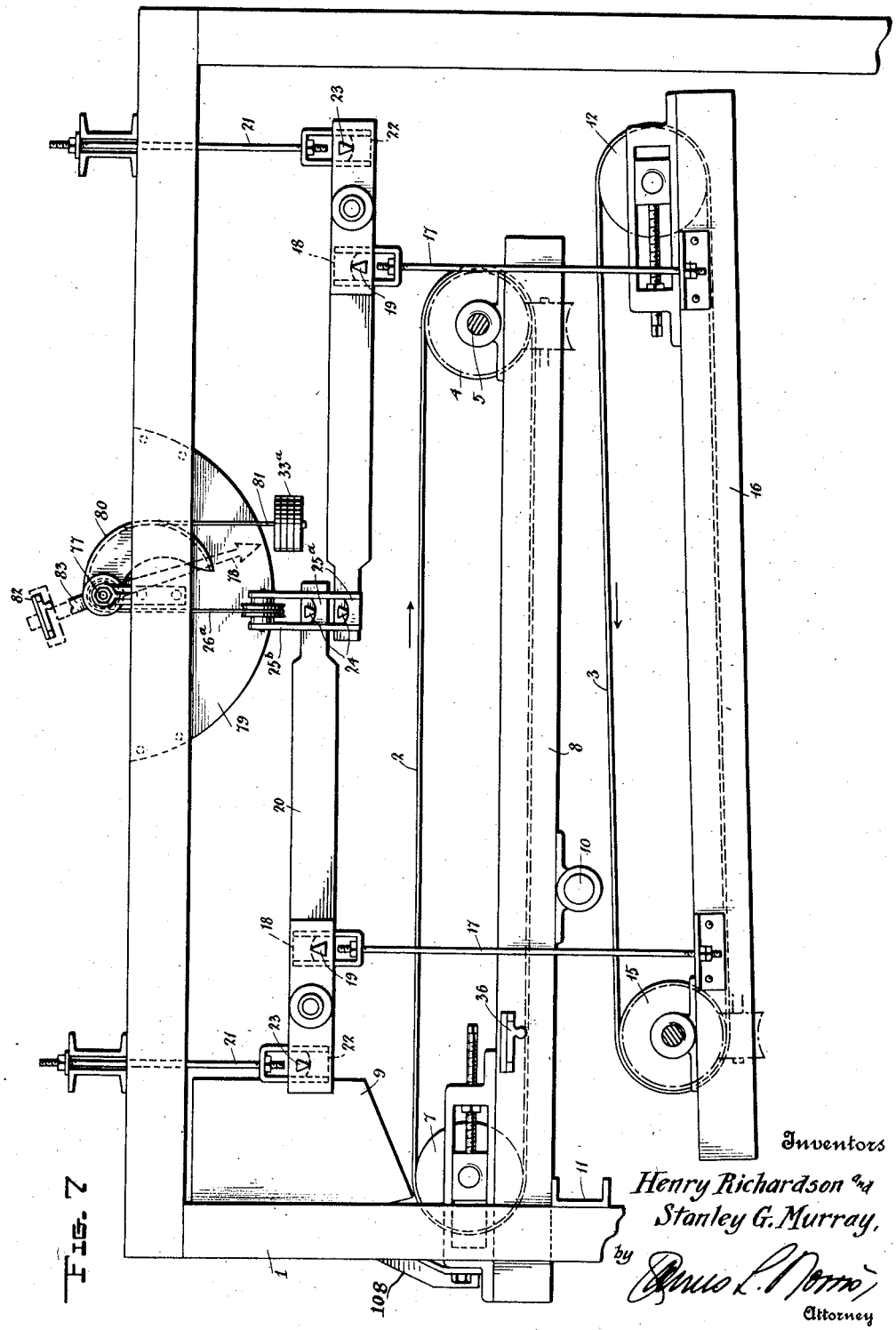

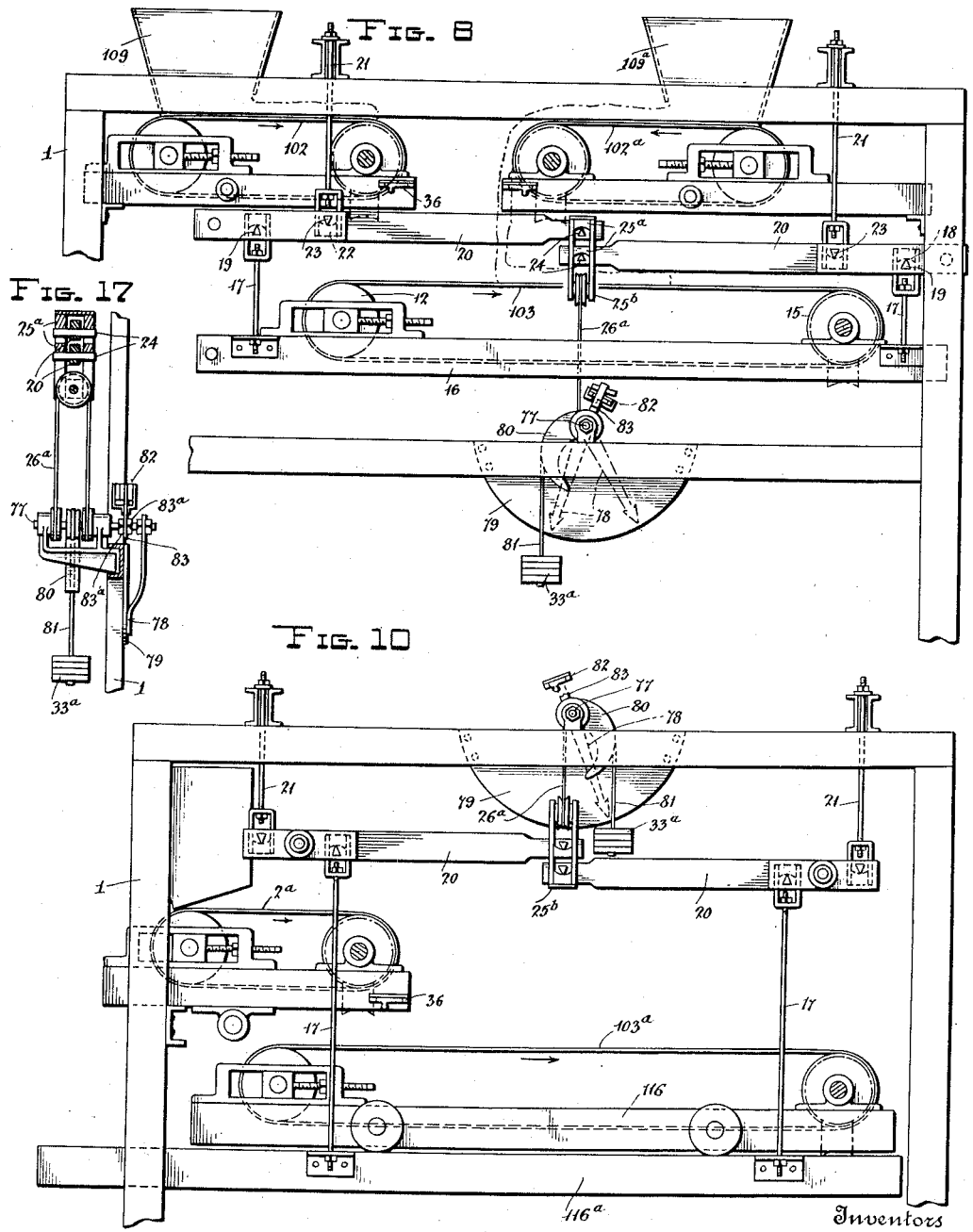

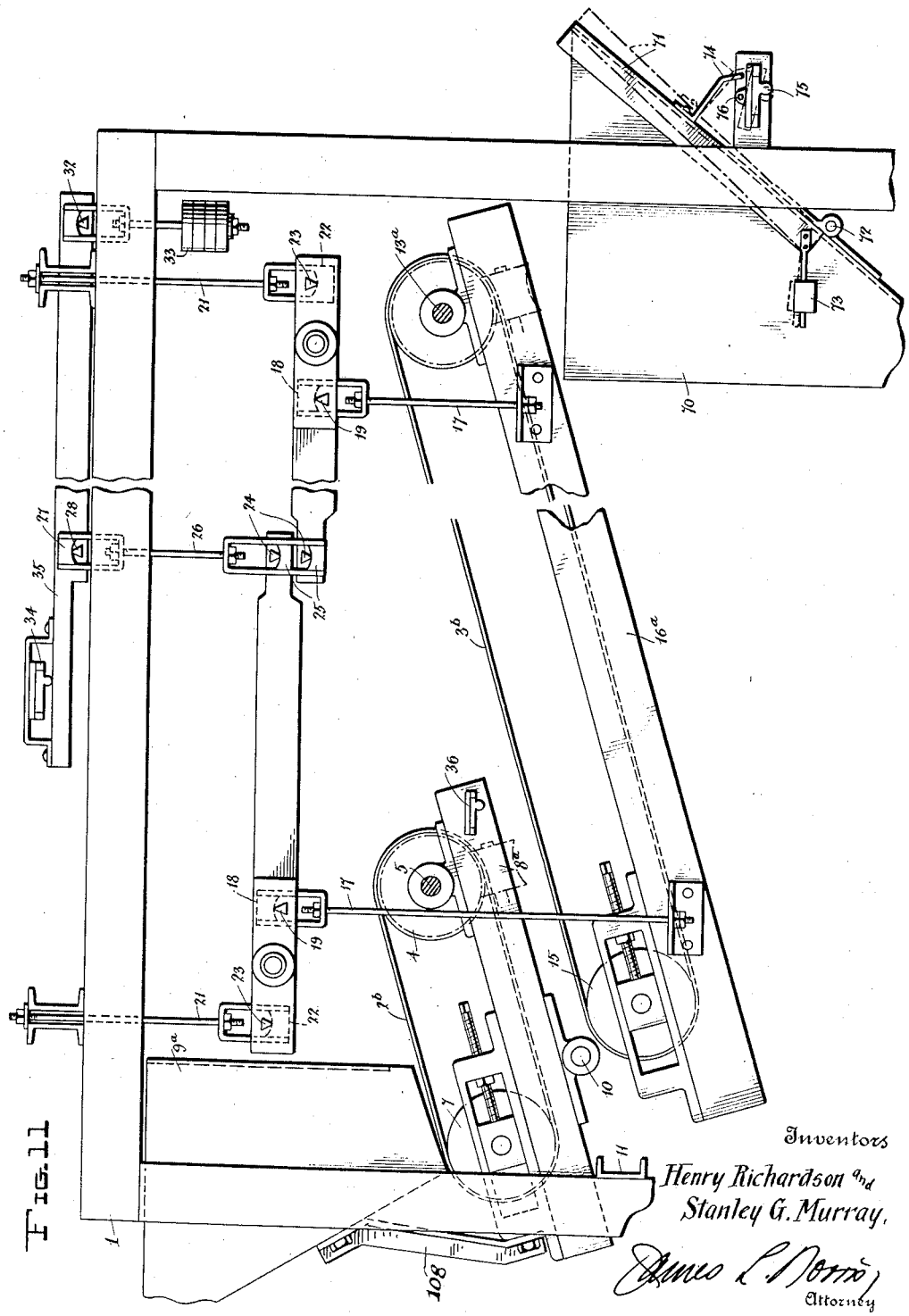

Oct. 2, 1928.
H. RICHARDSON ET AL
1,686,502
AUTOMATIC WEIGHING MACHINE
Filed Oct. 30, 1926    8 Sheets-Sheet 7
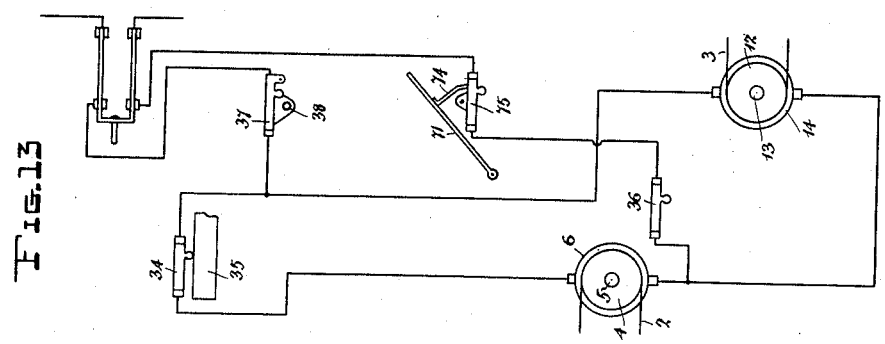
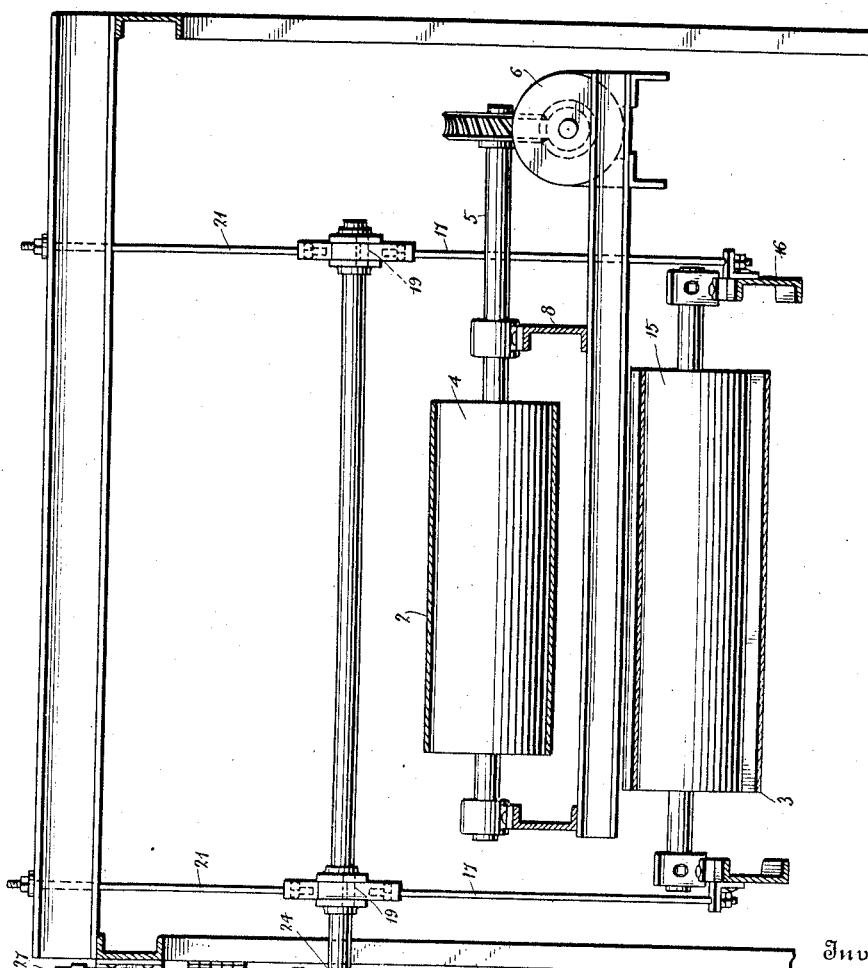
Inventors
Henry Richardson and
Stanley G. Murray,
By
Attorney

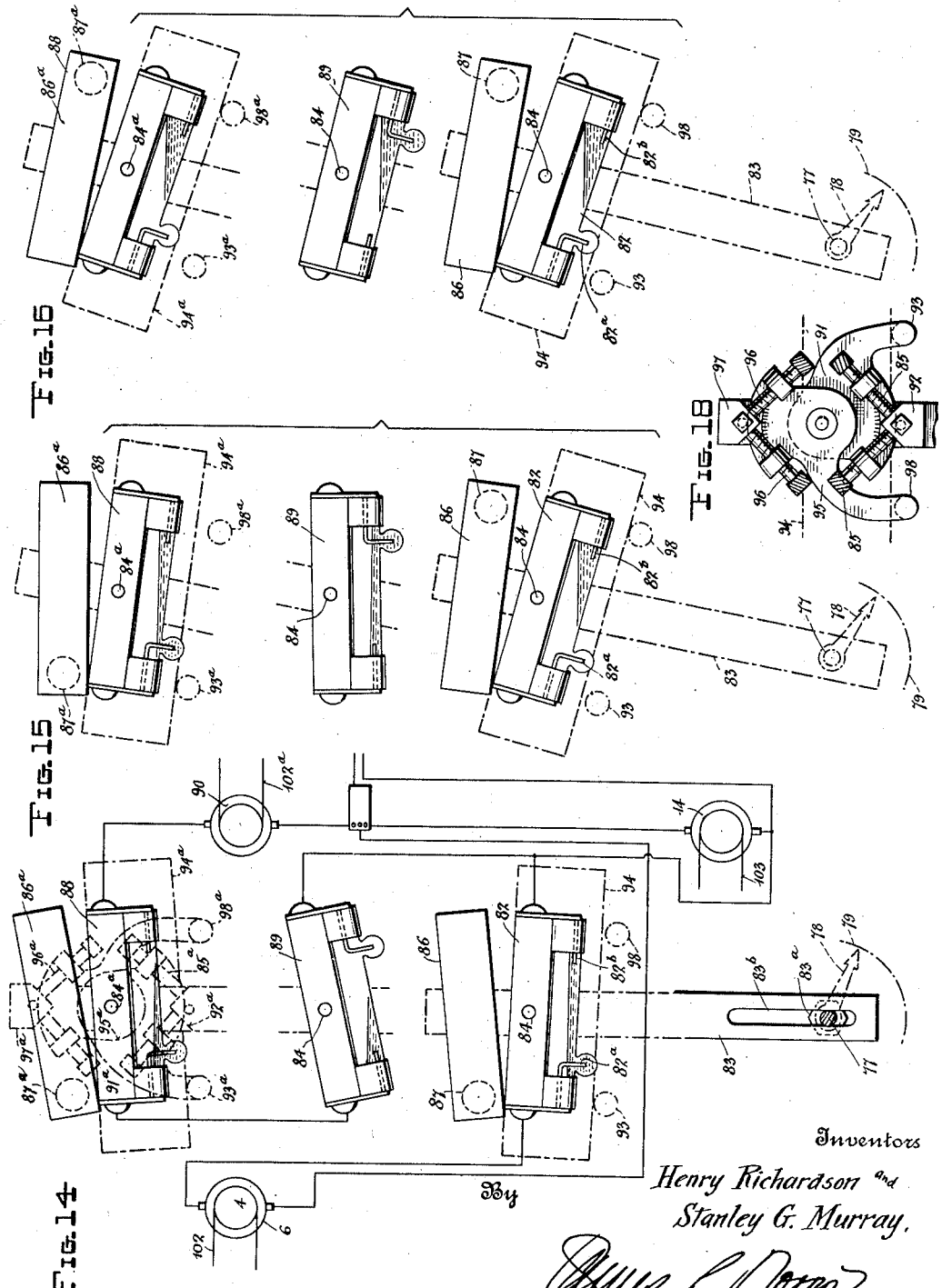

Patented Oct. 2, 1928.

1,686,502

UNITED STATES PATENT OFFICE.

HENRY RICHARDSON AND STANLEY G. MURRAY, OF CLIFTON, NEW JERSEY.

AUTOMATIC WEIGHING MACHINE.

Application filed October 30, 1926. Serial No. 145,241.

The present invention relates to improvements in weighing machines and more particularly to those of the automatic type wherein the weighing and discharging operations are performed successively and automatically or without requiring manual control or operation by an attendant.

The primary object of the invention is to provide a novel and improved weighing machine of this general type whereby the operations of weighing the charges and dumping the weighed charges may be performed more rapidly and with greater facility than is possible with weighing machines of the automatic type employing a weigh hopper or bucket which requires successive filling and emptying.

According to the present invention, each charge, while being made up, is being advanced toward the discharge point, and furthermore, while one weighed charge is being discharged, the next succeeding charge is being made up, much time being thereby saved in the operation of making up and discharging the charges. Moreover, each weighed charge is weighed separately or independently, notwithstanding that it is travelling toward the discharge point, and, hence, accuracy in the weighing operations is insured.

To these ends, the invention embodies a travelling conveyor or its equivalent which operates continuously to advance the material to the discharge point, such conveyor being supported by weighing mechanism whereby the charges of material thereon may be weighed, and one or more feed conveyors for supplying the material to be weighed to the first-mentioned weighing conveyor, the feed conveyor or conveyors being intermittently operative and controlled by the weighing mechanism whereby the material to be weighed will be fed to the weighing conveyor during the continuous advance thereof until a charge of predetermined weight has been supplied thereto, whereupon the operation of the feed conveyor or conveyors will be interrupted; and after the discharge of the weighed charge from the weighing conveyor has commenced, the feed conveyor or conveyors will be automatically set into operation to supply the next succeeding charge to the weighing conveyor.

The present invention provides means for automatically controlling the starting and stopping of the feed conveyor or conveyors from the weighing mechanism. It also preferably provides means for automatically stopping the feed and weighing conveyors in the event that the supply of material to the weighing machine becomes interrupted or unduly reduced, or in the event the material becomes clogged within the machine by lumps, débris or the like; it provides safety means for automatically stopping the operation of the feed and weighing conveyors in the event the operative mechanism of the machine becomes jammed, and it provides means for automatically stopping the operation of the feed and weighing conveyors in the event the weighed charges from the weighing conveyor are not removed promptly or they accumulate.

To these and other ends the invention consists in certain improvements and combinations and arrangements of parts, all as will be hereinafter more fully described, the features of novelty being pointed out particularly in the claims at the end of the specification.

In the accompanying drawings:—

Figure 1 is a side elevation of an automatic weighing machine constructed in accordance with one embodiment of the invention;

Figure 2 is a side elevation of an automatic weighing machine constructed in accordance with another embodiment of the invention;

Figure 3 is a detail view of a portion of the weighing machine shown in Figure 2, illustrating the mode of operation of the automatic stopping means thereof;

Figure 4 is a detail view of part of the stopping means shown in Figure 3, illustrating it in the position in which it stops the machine;

Figure 5 is a top plan view of the safety drive between the motor and the weighing conveyor in Figs. 2, 3 and 4;

Figure 6 represents a section on the line 6—6 of Figure 5, showing the safety drive in condition to stop the machine;

Figure 7 is a side elevation of an automatic weighing machine similar to that shown in Figure 1, but showing a dial weighing mechanism employed in conjunction therewith;

Figure 8 is a side elevation of an automatic weighing machine of the double or proportioning type adapted to make up weighed charges of two or more materials;

Figure 9 is a detail elevation on an enlarged scale of the controlling switches employed in conjunction with the dial mechanism shown in Figure 8;

Figure 10 is a side elevation of an automatic weighing machine constructed in accordance with another embodiment of the invention, the weighing conveyor being adjustable longitudinally to conform with the different weights of the charges;

Figure 11 is a side elevation of an automatic weighing machine constructed in accordance with another embodiment of the invention wherein the feed and weighing conveyors are inclined upwardly toward their discharge ends and an automatic stopping device is provided for stopping the machine in the event the weighed charges are not removed promptly or they accumulate;

Figure 12 represents a vertical cross-section through the embodiment of the machine shown in Fig. 1;

Figure 13 is a diagrammatic view of the motors for the feed and weighing conveyors and the switches which control the operation of the feed conveyor and of the feed and weighing conveyors;

Figure 14 is a diagrammatic view of the controlling switches shown in Figures 8 and 9, these switches being shown in this figure in condition to cause operation of one of the feed conveyors while the weighing conveyor operates continuously but the other feed conveyor is idle;

Figure 15 shows the switches of Figure 14 in condition to interrupt operation of the feed conveyor which operates first and to cause operation of the second feed conveyor; and Figure 16 shows the switches of Figures 14 and 15 in condition to interrupt the operation of the second feed conveyor; and Figure 17 is an elevation of the dial mechanism as viewed from an end of the weighing machine.

Figure 18 is a side elevation of the adjustable stops shown in Fig. 9, as viewed from the left in said figure.

Similar parts are designated by the same reference characters in the several figures.

Automatic weighing machines embodying the present invention are applicable generally to various situations where it is desired to weigh powder, granular or other loose materials with speed and facility. The preferred embodiments of the invention are shown in the accompanying drawings and will be hereafter described in detail, but it is to be understood that the invention is not restricted to these particular embodiments of the invention as equivalents thereof are contemplated and such will be included within the scope of the claims.

In the embodiment of the invention shown in Figure 1, the machine comprises a suitable framework 1 in which is mounted a feed conveyor 2 and a weighing conveyor 3. These conveyors may be of any types or constructions, according to the nature of the material to be weighed, they consisting, for example, of the commonly known steel apron feeders or of ordinary rubber and canvas belt having skirt boards along their entire lengths sufficiently high to contain the desired loading. The feed conveyor, which is endless, passes over a driving roller 4, the shaft 5 of which may be driven in any suitable way, preferably by an electric motor 6, and this feed conveyor passes over an idler roller 7. The rollers 4 and 7, together with the feed conveyor and its driving motor are mounted as a unit on a frame 8, and this frame also carries, by a bracket 108 fixed thereto, or other suitable means, a hopper 9 which receives the material to be weighed at the top and serves to discharge the material from its bottom onto the upper stretch of the feed conveyor which travels toward the right in Figure 1 while it is in operation. The frame 8 which carries the feed conveyor, together with its rollers and driving means and the feed hopper is mounted to rock on pivots 10 which are supported in the sides of the main stationary frame 1, these pivots allowing the frame 8 together with the conveyor and its associated parts to rock in a vertical plane, and the main stationary frame 1 has a rail 11 fixed thereon on which the frame 8 carrying the feed conveyor may come to rest. The frame 8, together with the feed conveyor and other parts mounted thereon is so proportioned and arranged that while the feed hopper 9 contains a sufficient amount of material to insure normal feeding of such material to the weighing conveyor, the weight of the material in the feed hopper will be sufficient to hold the frame 8 down so that it rests on the rail 11, but when the amount of material in the feed hopper becomes diminished, due, for example, to an interruption or an undue reduction in the supply of material to the machine, the weight of material then in the feed hopper will be insufficient to hold the frame 8 in contact with the rail 11 and the left-hand end of the frame 8, that is, the end thereof on which the feed hopper is mounted, will tilt upwardly, for a purpose which will hereinafter appear.

The weighing conveyor 3, the right-hand portion of which receives material discharged from the right-hand end of the feed conveyor, and which is arranged below the feed conveyor so that it may thus receive material therefrom, passes around a driving roller 12, the shaft 13 of which may be connected to a driving motor 14, and this conveyor passes around an idler roller 15 at its discharge end. The upper stretch of the weighing conveyor 3 travels toward the left in Figure 1 so that substantially the full length of the upper stretch of this conveyor may be utilized for the charges of material to be weighed. The weighing conveyor, together with its supporting rollers and driving means is suspended by a suitable weighing mechanism. As shown in the present instance, the frame 16 on which the rollers for the weighing conveyor are mounted is suspended at its sides by pairs of rods 17, the upper ends of these rods being provided with yokes which contain bearings 18 and these bearings rest on knife edges 19 which are carried by auxiliary weigh beams 20, a pair of which is provided at each side of the machine. The auxiliary weigh beams are suspended at their ends by rods 21 which are supported from the top of the main stationary frame 1, the lower ends of these rods being provided with yokes which contain bearings 22 on which knife edges 23 on the ends of the auxilary weigh beams rest. The inner or free ends of the auxiliary weigh beams 20 are provided with knife edges 24 which rest on bearings 25 contained in a yoke attached to the lower end of a rod 26, the upper end of this rod being provided with a yoke which contains a bearing 27 which bears on a knife edge 28 carried by a main weigh beam 29. The main weigh beam has a knife edge 30 at each side which rests on a bearing 31 on the respective side of the main frame of the machine, and the opposite end of the main weigh beam as a knife edge 32 from which a counter-weight 33 is suspended.

In weighing mechanism of the type just described, the counter-weight 33 is so chosen that the main weigh beam will be balanced or will come to a poise when a predetermined charge of material rests on the weighing conveyor which is suspended by the weighing mechanism.

According to this embodiment of the invention, the weighing conveyor 3 operates continuously but the feed conveyor 2 operates intermittently. The feed conveyor will commence to operate to feed material to the weighing conveyor when the latter rises incident to the discharge of a weighed charge of material therefrom, and the feed conveyor will continue to operate and thus make up a weighed charge on the weighing conveyor until the main weigh beam comes to a poise, whereupon the operation of the feed conveyor will be interrupted, a complete properly weighed charge of material being then contained on the weighing conveyor.

The starting and stopping of the feed conveyor are controlled automatically. Preferably, an electric switch 34, for example of the mercury type, is mounted on or connected to the main weigh beam 29 by an extension thereof designated 35, this switch being included in or controlling the power circuit of the motor 6 which drives the feed conveyor. This switch is so mounted and arranged that when the weighing conveyor is elevated, as is the case when the weighing conveyor does not contain a full-weighed charge of the material, the switch 34 will close the circuit of the motor 6 and thereby cause operation of the feed conveyor. The operation of the feed conveyor continues until the weighing conveyor descends and thereby brings the main weigh beam to a poise, this movement of the main weigh beam causing the switch 34 to open or break the power circuit for the motor 6 and thereby arresting the operation of the feed conveyor. The operation of the feed conveyor will thus be arrested, and the feeding of material to the weighing conveyor will be interrupted at the moment the weighing conveyor contains a complete weighed charge of material. Although the feed conveyor is thus stopped to interrupt the feed of material to the weighing conveyor, the latter conveyor continues to operate and in so doing it advances the weighed charge of material thereon to the discharge end of this conveyor and from which the material is progressively discharged by the continuous movement of this conveyor.

The feed conveyor 2 is preferably driven at a higher speed, preferably double the speed of the weighing conveyor, so that a relatively thin stream of material will be distributed along the feed conveyor, thus enabling accuracy in the weighing operation to be attained, but causing the material to be piled in a relatively deeper layer on the weighing conveyor 3 and thus enabling a relatively large amount of material to be received in the length of the weighing conveyor.

It will be understood that at the moment a full charge of material has been made up on the weighing conveyor, none of this material is being fed onto the weighing conveyor and none of the material thereon is being discharged therefrom. The weighing mechanism is, therefore, able to accurately weigh each charge. The continuous operation of the weighing conveyor, however, causes the weighed charge to begin to discharge from this conveyor. At an early point in this dicharge, the weight of material removed from the weighing conveyor will be sufficient to unbalance the main weigh beam and thus cause the counter-weight 33 to act to elevate the weighing conveyor, and this operation will cause the switch 34 to again start the motor 6 into operation to drive the feed conveyor 2 whereby the making up of the succeeding charge of material on the weighing conveyor commences. While the making up of the succeeding charge of material on the weighing conveyor commences before the preceding charge has been completely discharged therefrom, yet each charge maintains its individual identity and is individually or independently weighed. It will be understood that the weight of the counter-poise 33 may be varied through a relatively wide range to set the machine to weigh different quantities of material.

The operation of the machine requires a full feed of material during weighing. For example, if the supply of material were greatly reduced, the material might be supplied by the feed conveyor 2 to the weighing conveyor 3 at such a reduced rate that a full weighed charge would not be made up on the weighing conveyor before such charge commenced to discharge from this conveyor, due to the continuous operation of the weighing conveyor 3. In such event, the weighing conveyor would not descend, and, hence, the operation of the feed conveyor would not be interrupted. Such a condition, however, is provided for. By mounting the feed conveyor, its feed hopper and associated parts so that they may rock on the pivots 10, a full or normal supply of material in the feed hopper will retain the feed conveyor in its normal operative position but a substantial reduction in the amount of material in the feed hopper will cause the feed conveyor to tilt, and this tilting motion of the feed conveyor is utilized to automatically interrupt the operation of the feed and weighing conveyors. Preferably, and as shown, a switch 36 is provided which may be of the mercury type, this switch being mounted on or connected to frame 8 which supports the feed conveyor, this switch being interposed in the power circuit of both motors 6 and 14. The switch is so connected and arranged that while the feed conveyor is in its normal operative position and is receiving a normal supply of material, it will close the circuits of the motors 6 and 14 so that these motors may operate the feed and weighing conveyors, respectively, but when the feed conveyor tilts out of its operative position due to an insufficient supply of material in the feed hopper, the switch 36 will break the circuits of both motors 6 and 14 and the operation of both the feed and weighing conveyors will be thereby interrupted. Stoppage of the machine is thus effected when conditions might arise which would preclude the performance of accurate weighing operations, although the machine will be restored to proper operative condition upon the supply of a full stream of material to the feed hopper.

The automatic control of the feed and weighing conveyors by the switches 34 and 36 will be clear from the diagram, Fig. 13. As shown in this figure, the switch 34 is connected in one side of the circuit of the motor 6 which operates the feed conveyor whereby ascent of the weighing conveyor and consequent upward swing of the main weigh beam will tilt or rock the switch 34 in a direction to close the circuit of the motor 6 and thereby start the same into operation, and descent of the weighing conveyor and consequent swing of the main weigh beam into poised position will rock the switch 34 in a direction to open the circuit of the motor 6 and thereby interrupt the operation of the feed conveyor. The switch 36 is connected in circuit with both the feed conveyor motor 6 and the weighing conveyor motor 14, and, hence, an upward tilt of the feed conveyors, due to an insufficient supply of material in the feed hopper thereon will rock the switch 36 in a direction to open the circuits of both motors 6 and 14 and thereby stop the operation of the feed and weighing conveyors, although while the feed conveyor occupies its normal level or operative position, as is the case while a sufficient supply of material is contained in the supply hopper, the switch 36 will occupy a position where it closes and maintains closed the circuits of both motors 6 and 14 and thereby insures driving of the feed and weighing conveyors, the feed conveyor, however, operating under control of the switch 34 while the weighing conveyor is independent of the switch 34.

The weighing conveyor 3 may be arranged so that it slopes downwardly toward its discharge end, substantially as is shown in Figure 1. This downward slope of the weighing conveyor towards its discharge end enables the weight of the material on this conveyor to be utilized as an aid to the driving of this conveyor, thereby reducing the amount of power required to drive the conveyor.

It is possible, in the operation of a weighing machine of this class, to have a full supply of material in the feed hopper but the feed of material from the feed hopper or from the feed conveyor to the weighing conveyor may become unduly diminished and thus impair or interfere with the intended weighing operations, due to the clogging of the crushed, granular, powdered or other like material at the outlet of the feed hopper by lumps, débris or foreign matter of unusual size which may clog or block the outlet of the feed hopper to the feed conveyor. Figures 2, 3 and 4 illustrate means provided by the present invention for automatically stopping the machine in such an event, thus avoiding continued operation of the machine under such conditions where no weighing operations may take place.

In Figure 2, the feed conveyor 2ª is made relatively short in length, as compared with the feed conveyor 2 in Figure 1, but is mounted in a similar manner upon a frame 8ᵃ which also carries the feed hopper 9ᵃ, the frame 8ᵃ being tiltable on pivots 10 and arranged to normally rest upon a rail 11 under the influence of a full supply of material in the feed hopper 9ᵃ. The tilting motion of the frame 8ᵃ carrying the feed conveyor operates the switch 36 to control the operation of the feed and weighing conveyors, as in Figure 1. The weighing conveyor 3ᵃ which is arranged beneath the feed conveyor is shown arranged horizontally and the right-hand end of the feed conveyor, which is the discharge end thereof, is arranged above the material-receiving or left-hand end of the weighing conveyor, X representing the stream of material passing from the feed conveyor to the weighing conveyor. The upper stretch of the weighing conveyor, in this instance, moves toward the right or in the same direction in which the upper stretch of the feed conveyor moves, the material discharging from the right-hand end of the weighing conveyor, as indicated at X'. The weighing conveyor is mounted on a frame 16ᵃ which is suspended from weighing mechanism which is similar to or corresponds with that shown in Figure 1, and the mode of operation of the weighing machine shown in Fig. 2 is substantially the same as that described in connection with Figure 1, the weighed charges of material, however, discharging from the right-hand end of the weighing conveyor.

The automatic means for stopping the weighing machine in the event the stream of material passing from the feed hopper to the feed conveyor becomes unduly diminished, comprises a switch 37 which, as shown by the diagram, Figure 13, is connected in the circuits of both the feed conveyor motor 6 and the weighing conveyor motor 14. This switch may be pivoted at 38 so that it may rock into either of two relatively reverse positions to close and open respectively the circuits of both motors. The switch mounting is connected by a link 39 to a lever 40, the latter being pivoted at one end to the main stationary frame, as at 41, and the opposite end of this lever being provided with a weight 42 which constantly acts to swing the lever 40 downwardly, thus pulling downwardly on the link 39 and tending to hold the switch 37 in the tilted position shown in Figure 2, the switch when in this position closing both motor circuits and maintaining them in such condition. The operation of the switch 37 is effected through a guard or plate 43 which is mounted to swing about a pivot 44 on the main frame so that it may occupy either the full or dotted line positions shown in Figure 2. This plate which is preferably curved substantially as shown is mounted directly above the roller for the discharge end of the weighing conveyor so that it may drop by gravity into substantially the dotted line position, Fig. 2, while the gaps between successive charges of material on the weighing conveyor are passing beneath the plate, or, when the depth of the layer of the material on the weighing conveyor is unduly diminished. The pivoted plate is connected by links 45 and 46 to the lever 40, these links being intermediately connected by a pivot 47, the upper end of the link 45 being connected to the lever 40 by the pivot 48 and the lower end of the link 46 being connected to the plate 43 by the pivot 49. The links 45 and 46 thereby form a toggle between the swinging portion of the plate 43 and the lever 40 and this toggle may occupy either the unlocked or flexing position shown by the full lines in Figure 2, or it may occupy the locked position shown by the dotted lines in that figure, the upper link 45 bearing against the pivoted end of the plate 43 when the links are in their locked position.

Means is provided for controlling the links 45 and 46 whereby they may flex during the upward swing of the plate 43, following its descent into the gap intervening between successive charges of material on the weighing conveyor, during the normal operation of the machine, and thus avoid interruption of its operation, but will set these links so that stopping of the machine will be effected in the event that an insufficient stream of material is fed to the weighing conveyor to carry out the weighing operation. The means provided for this purpose in the present instance comprises a bell-crank lever 50 which is pivoted at 51 to the stationary main frame of the machine, this lever having a horizontal arm 52 which is arranged beneath a pin 53 which projects from the extension 35 on the main weigh beam. The lower or vertical arm 54 of the bell-crank lever is pivotally connected to a link 55, the opposite end of this link being pivotally connected at 56 to the link 45. The mode of operation of the automatic stop means described is as follows: The main weigh beam, upon completion of a weighing operation, descends or assumes the position shown in Figure 2, thus causing the pin 53 thereon to bear on and depress the horizontal arm 52 of the bell-crank lever. The vertical arm 54 of the bell-crank lever is thus swung from the dotted into the full line position shown in Figure 2, thereby swinging the links 45 and 46 into the full line position, the links, when in this position, being flexible so that the plate 43 may swing upwardly without disturbing the switch controlling lever 40. Consequently, if a full charge has been weighed on the weighing conveyor, discharge of this material from the weighing conveyor may take place without stopping the machine. However, if a foreign body lodges in the outlet of the feed hopper 9ª so that the stream of material passing from this hopper to the feed conveyor 2ª is reduced to the extent that the weighing conveyor does not receive a full charge of material before it begins to discharge such charge, the main weight beam will not descend into the full line position shown in Figure 2, as a consequence of which the bell-crank lever 50 will remain in its dotted line position, Fig. 2, and the links 45 and 46 will rest by their weight in the dotted line position shown in this figure, the upper link 45 bearing against the pivoted end of the plate 43. The links 45 and 46, when in this position, are locked and, hence, an upward swing of the plate 43 will cause the links 45 and 46 to swing the lever 40 upwardly thereby reversing the position of the switch 37, as shown in Figures 3 and 4, and thereby interrupting the circuits of the motors 6 and 14, and consequently arresting the operation of the feed and weighing conveyors. This upward swing of the plate 43 which, under such condition would stop the operation of the machine, is effected by the material on the weighing conveyor which makes up the insufficient weighed charge, this material pushing the plate 43 upwardly as it discharges over the roller at the discharge end of the weighing conveyor. It will thus be understood that the operation of the machine will be automatically interrupted in the event the weighing conveyor does not receive a full charge of material, notwithstanding that a full feed of material may be applied to the feed hopper, although the stopping device provided for this purpose will not interfere with the operation of the machine while the weighing conveyor is receiving full charges of the material, the flexible or locking conditions of the controlling links being governed by the weighing mechanism which descends or comes to a poise when the weighing conveyor receives full weighed charges but which does not descend when the feed of material to the weighing conveyor is insufficient to make up the full weighed charges.

The present invention, furthermore, provides safety means for stopping the machine in the event that foreign matter jams the conveyors and causes an undue strain upon the driving means, such means being shown in detail in Figures 5 and 6. This safety drive means comprises a coupling member 57 which is fixed to the drive shaft 13ª of the weighing conveyor and a cooperative coupling member 58 which is connected to the shaft of the respective motor 14. These coupling members are connected by a driving pin 59 which is so proportioned that it will transmit the normal load to the motor and thus insure driving of the weighing conveyor under normal conditions but will shear or break when an undue load or strain is imposed upon the motor. The coupling member 57 has an outwardly sloping cam surface 60 thereon and the coupling member 58 carries an arm 61 which is pivoted on the pin 62 carried by the coupling member 58 and has a lateral projection 63 which overlies or bears on the cam surface 60 of the coupling member 57. A tension spring 64 is attached to a pin 75 on the coupling member 58 and to the free end of the arm 61, the spring normally acting to hold the arm 61 in its inner position as shown by the dotted lines in Figure 6, where the outer circumference of the arm 61 will be concentric with the outer peripheries of the coupling members. However, when the pin 59 shears due to abnormal resistance to the drive of the weighing conveyor, the coupling member 69 will continue to revolve with the motor shaft while the coupling member 57 stops, the relative motion between the coupling members then causing the projection 63 on the arm 61 to ride on the cam surface 60 of the stationary coupling member 57 thereby throwing this arm 61 outwardly beyond the periphery of the coupling members. The arm 61 when thrown into such position acts on the portion 66 of a lever 67 which is pivoted at one end, as at 68, to the main stationary frame, swinging this lever upwardly, and the free end of this lever is connected by a link 69 to the link 55 and it is connected by the latter link to the link 45. Upward deflection of the lever 67 under the action of the outwardly projecting arm 61 will thereby force the link 45 upwardly, thereby acting to swing the lever 40 in a direction to rock the switch 37 into a position to interrupt the operation of both motors 6 and 14, as represented in Figure 4, the switch 37 being connected in the circuits of both motors 6 and 14 as shown in Figure 13. Thus operation of the machine is interrupted until the obstruction has been removed and the damage repaired, after which insertion of a new shear pin in the coupling will restore the machine to operative condition.

The present invention furthermore provides means for automatically stopping the machine in the event the weighed charges are not promptly removed from the discharge end of the weighing conveyor or such charges tend to accumulate at that point. Means for accomplishing this purpose is shown in Figure 11 wherein a hopper 70 is provided beneath the discharge end of the weighing conveyor 3ᵇ to receive the weighed charges successively therefrom. This hopper has a plate 71 which is pivoted at 72 and is normally and yieldingly held in its full line position by a weight 73, the weight being of sufficient mass to sustain the weight of the material as it normally discharges through the hopper. However, the weight will rise and permit the plate to be depressed into its dotted line position in the event the material clogs at the outlet of this hopper or otherwise accumulates therein. The plate is provided with an arm 74 which cooperates with a switch 75, the latter being pivoted at 76, so that it normally occupies the full line position, but when the plate 71 is tilted under the undue pressure of the material accumulated in the hopper, the arm 74 acts on the switch 75 to swing it into the dotted line position shown. The switch 75, as is shown in Figure 13, is connected in the circuits of both the feed conveyor motor 6 and the weighing conveyor motor 14. When it occupies its normal position, as shown by the full lines in Figure 11, the circuits of both motors are closed through this switch, but when the switch is tilted into the dotted line position, the circuits of both motors are broken and the operation of the feed and weighing conveyors is arrested. This device prevents confusion or mixing of the weighed charges successively delivered from the weighing conveyor, and when the obstructing material has been discharged from the delivery hopper, the plate 71 and switch 75 are automatically restored to proper operating condition.

The feed conveyor 2ᵇ and weighing conveyor 3ᵇ shown in Figure 11 are similar to the feed and weighing conveyors shown in the preceding figures with the exception, however, that both conveyors slope upwardly toward their discharge ends and thus enable the weighing mechanism to be accommodated in places where the vertical space available is restricted. In this figure both the feed and weighing conveyors travel in the same direction, as in Fig. 2, and they may be controlled by controlling devices such as those shown and described in connection with Figures 1 and 2.

Instead of employing weighing mechanism such as that shown in Figures 1, 2 and 3 embodying a main weigh beam which is adapted to come to a poise, a weighing mechanism employing a dial such as shown in Figures 7 to 10, inclusive, may be used. As shown in Figure 7, the feed and weighing conveyors, together with the mounting and driving means therefor, are the same as shown in Figure 1. The auxiliary weigh beams 20, however, are connected through their knife edges 24 to bearings 25ᵃ carried by a yoke 25ᵇ, this yoke being connected by a cable or ribbon 26ᵃ to the shaft 77 of a dial indicator 78, the latter cooperating with a relatively fixed appropriately graduated dial scale 79. The dial shaft 77 carries a scroll-shaped cam 80 on which a cable or ribbon 81 rests, the counter-weight 33ᵃ being attached to and suspended by this cable. In using such a dial system, or any other well known dial system, the descent of the weighing conveyor while the weighed charge is being made up thereon will be progressive, the dial indicator 78 rotating with its shaft 77 as the weight of the charge increases. In using a dial system of this general class, the rotation of the dial shaft 77 is utilized to operate the switch which arrests the operation of the feed conveyor and thus stops the feed of material to the weighing conveyor at the moment the latter conveyor has received a full weighed charge of material. As shown in Figure 7, the switch 82 which is connected in the circuit of the motor which drives the feed conveyor is connected to the dial shaft 77 by an arm 83 whereby the switch will rotate in unison with the dial shaft. This switch which may be of the mercury type will close the circuit of the motor 6 which drives the feed conveyor when the weighing conveyor rises due to discharge of a weighed charge therefrom and it will maintain the circuit of this motor closed during the making up of another charge of material on the weighing conveyor until a charge of predetermined weight has been received by the weighing conveyor, whereupon this switch will interrupt the circuit of the motor 6 and thereby stop the feed conveyor until a sufficient amount of the weighed charge has been discharged from the weighing conveyor to permit a rise of the weighing conveyor and consequent downward rotation of the dial shaft 77. Inasmuch as the major portion of a weighed charge will always be contained on the weighing conveyor during the normal operation of the machine, the dial shaft 77 will normally swing through a relatively small angle incident to the making up of a full weighed charge on the weighing conveyor and the discharging of the charge therefrom, and the switch 82 is mounted on the dial shaft 77 so that it will be rocked into either circuit closing or circuit opening position during the rotation of the dial shaft through this relatively small angle, it being understood that when the dial shaft is rotated into one position corresponding with the making up of a full weighed charge of material on the weighing conveyor, as, for example, is shown in Figure 7, the switch 82 will occupy a position where it interrupts the circuit of the motor 6 which drives the feed conveyor, thereby stopping the feed conveyor, and when the dial shaft 77 rotates to its other extreme position corresponding with the discharge of part of the weighed charge of material from the weighing conveyor, the switch 82 will have been rocked into a relatively reverse position where it closes the circuit of the motor 6 and thereby sets the feed conveyor into operation to feed another charge of material on to the weighing conveyor, it will be understood that the switch arm 83 may be clamped or otherwise connected in different angular positions with respect to the dial shaft 77 to conform with different weights of charges to be weighed by the machine, the arm 83 being shown in the present instance clamped between nuts 83ª on the dial shaft, the latter extending through a longitudinal slot 83ᵇ in the arm 83.

Figure 14 shows the switch 82 connected in circuit with the feed conveyor motor 6. The switch as shown in this instance is of the mercury type having terminal electrodes 82ª and 82ᵇ at its ends adapted to be bridged by a body of mercury contained within the switch, which may be in the form substantially of a tube. The switch as shown in this instance is mounted on a shaft 84 pivoted in a frame 83ª carried by the switch supporting arm 83 so that it may rock relatively to said arm, and its rocking movements are limited by adjusting screws 85 which are carried by a segment 91 pivoted on the frame 83ª concentrically of the shaft 84, the ends of the screws bearing against a stop 92 fixed on the frame 83ª. A stop finger 93 carried by the segment 91 projects below a plate 94 fixed on the shaft 84. A similar segment 95 pivoted on the frame 83ª concentrically of the segment 91 and the shaft 84 carries adjusting screws 96 the ends of which bear against a stop 97 fixed to the frame 83ª, and this segment carries a stop finger 98 which projects below the plate 94 at the side of the shaft 84 opposite to that at which the stop finger 93 is located. The stop fingers 93 and 98 are thus adjustable so that they may occupy different positions, thereby varying the limit positions of this switch. In order to effect a quick throw of this switch into either of its extreme positions while the arm 83 is being swung in one direction or the other during rotation of the dial shaft 77, a tubular member 86 which is closed at the ends and contains a ball or spherical weight 87 may be mounted on the switch so that it tilts in unison therewith. By this arrangement, during the swing of the arm 83 from one position to the other, the switch 82 will be supported in one of its extreme positions by the resting of one end of the plate 94 on one or the other of the stop fingers 93 or 98 until the tubular member 86 has passed a horizontal position, the slope of the member 86 then causing the ball 87 to roll to the opposite end of the member 86 and the transference of weight of the ball 86 to the opposite end of the switch 82 will cause the latter to quickly tilt and reverse its position about the pivot 84, the other end of the plate 94 then coming to rest on the other limiting stop finger. A similar action will take place, through the operation of the ball 87, during swing of the arm 83, due to rotation of the dial shaft, in a reverse direction, the ball effecting a quick shift in the position of the switch and also serving to retain the switch in one or the other of its two positions. For example, the ball is shown in the left-hand position in Figure 14, the plate 94 connected to the switch 82 then resting on the left-hand stop finger 98, while in Figures 15 and 16 the ball has shifted to the opposite right-hand position and the plate 94 is resting on the right-hand stop finger 93. The position of the switch 82 shown in Figure 14 corresponds with that occupied by the switch after the weighing conveyor has moved upwardly incident to the discharge of a weighed load therefrom, the switch then closing the circuit of the motor 6 which operates the feed conveyor, thus initiating the feeding of material to the weighing conveyor for the weighing of another charge. The weighing conveyor descends as the weight of the charge is made up thereon, causing rotation of the dial shaft in a direction which will swing the arm 83 toward the right in Figures 14–16, and at the moment the predetermined weight of material has been deposited on the weighing conveyor, the arm 83 will occupy such an angle of tilt as will cause the ball 87 to roll from the left to the right-hand end of the body 86, and due to the connection of this body with the switch 82, the latter will be rocked or tilted with its shaft 84 to the position shown in Figure 15, the body of mercury within the switch then interrupting the electrical connection between the electrodes of the switch and thereby interrupting the operation of the motor 6 which drives the feed conveyor. The circuit for the motor 14 which drives the weighing conveyor is not connected with the switch 82 and, hence, the weighing conveyor will operate continuously notwithstanding the intermittent operations of the feed conveyor.

Figure 8 shows an automatic weighing machine wherein two intermittently operating feed conveyors 102 and 102ª supplied with material to be weighed from feed hoppers 109 and 109ª feed different materials in predetermined proportions to a continuously operating weighing conveyor 103, the upper stretch of the feed conveyor 102 travelling toward the right, the upper stretch of the feed conveyor 102ª travelling toward the left, and the upper stretch of the weighing conveyor 102 travelling toward the right in this figure. The feed conveyors are preferably mounted on tiltable frames which actuate switches, the latter controlling the operation of the feed conveyors whereby the feeding of material will be interrupted in the event the supply of material to one or the other feed hoppers is interrupted or unduly diminished, substantially as has been described respecting the feed conveyors shown in Figures 1 and 2, and the weighing conveyor is suspended from weighing mechanism which actuates the shaft 77 of a dial mechanism like that shown in Figure 7 and described in connection therewith. In this instance, the switch 82 shown in Figure 14 is employed to arrest the operation of the feed conveyor 102 when a predetermined proportion of the material fed by that conveyor has been supplied to the weighing conveyor, and, in addition, a second switch 88 and a cooperative auxiliary switch 89 are employed to control the circuit of the motor 90 which drives the feed conveyor 102$^a$. The switch 88, which is preferably of the mercury type, may be a substantial duplicate of the switch 82, it being mounted to pivot with respect to the arm 83, on a shaft 84$^a$ which may be co-axial with but is rotatable independently of the shaft 84, and this switch is provided with segments 91$^a$ and 95$^a$ carrying adjusting screws 85$^a$ and 96$^a$, to bear against stops 92$^a$ and 97$^a$, and stop fingers 93$^a$ and 98$^a$ to cooperate with a plate 94$^a$ attached to this switch, thus providing adjustable means for limiting the tilting movements of the switch 88 in a manner similar to that described in connection with the switch 82 and its segments and adjusting screws, as shown in Fig. 9. The switch 88 is also provided with a quick-throw device 86$^a$ and a ball 87$^a$ which is operative therein, and the switch 88 contains terminals at its ends which are connected in the power circuit of the motor 90 and are adapted to be connected or disconnected by a body of mercury contained within the switch, according to the position into which the switch is tilted. The auxiliary switch 89 is connected to the switch 82 so that it will tilt in unison therewith about the axis 84, and this auxiliary switch is connected in the circuit of the motor 90 in series with the switch 88.

A double or proportioning weighing machine constructed as described operates substantially as follows: Assuming the weighing conveyor is driven continuously by its motor 14 (Fig. 14) and that the weighing conveyor has become elevated incident to the discharge of part of a weighed charge, the shaft 77 of the dial will then occupy a position in which the arm 83 fixed to it is substantially upright, as shown in Figure 14. The circuit for the motor 90 is then interrupted by the switch 88 and also the switch 89 and, hence, the feed conveyor 102$^a$ will be idle, but the circuit of the motor 6 which operates the feed conveyor 102 will be closed through the switch 82 and, hence, the conveyor 102 will operate to feed material from the hopper 109 onto the weighing conveyor. During the feed of this material to the weighing conveyor, the arm 83 will swing toward the right, due to rotation of the dial shaft 77, and when the arm 83 reaches a predetermined inclination which depends upon the proportion of the material from the conveyor 102 which it is desired to feed to the weighing conveyor, the spherical weight 87 will operate to swing the switch 82 from the circuit closing position shown in Figure 14 to the circuit opening position shown in Figure 15, the operation of the motor 6 and the feed conveyor 102 driven by it being thereby interrupted. At the same time, the auxiliary switch 89 swinging in unison with the switch 82, brings the mercury therein into position to bridge the terminals of this switch and thereby close the circuit for the motor 90 through it, and the body of mercury in the switch 88 is, at the same time, brought, by the tilt of the arm 83, into position to bridge the terminals of this switch and thus close the motor circuit 90 through it. The circuit for the motor 90 which drives the feed conveyor 102$^a$ is thus completed and the conveyor 102$^a$ operates to deliver material from the supply hopper 109$^a$ to the weighing conveyor. This operation continues until the total weighed charge of material has been made up on the weighing conveyor, at which time the latter will have disengaged to an extent which swings the arm 83 to the position shown in Figure 16, the spherical weight 87$^a$ then passing from the left-hand to the right-hand end of the body 86$^a$, thereby quickly reversing the position of the switch 88 about its axis 84$^a$. In consequence of this shift of the switch 88, the circuit of the motor 90 is interrupted and the feed conveyor 102$^a$ is stopped. The weighing conveyor, however, continues its operation, its driving motor 14 being unaffected by the operation of the switches 82, 88 and 89, and after part of the weighed charge has been delivered from this conveyor, the arm 83 returns to its initial position and the cycle of operations above described is repeated. In order to vary the relative proportions of the different materials supplied to the weighing conveyor by the conveyors 102 and 102$^a$, the adjusting screws 96 for the stop finger 98 and screws 96$^a$ for the stop fingers 98$^a$ may be adjusted to set these stop fingers in different vertical positions with respect to the controlling plates 94 and 94$^a$ for the switches 82 and 88. For example, by lowering the left-hand stop finger 98, an increased proportion of material will be supplied by the conveyor 102; and by lowering the left-hand stop finger 98$^a$, an increased proportion of material will be supplied by the conveyor 102$^a$ to the weighing conveyor. The segments which carry the stop fingers are preferably provided with suitably graduated scales, as shown, to aid in adjusting them.

Figure 10 illustrates another embodiment of the invention wherein the feed conveyor may be constructed and operated like the feed conveyor shown in Figure 2, but the weighing conveyor 103ª is mounted on a carriage 116 which is shiftable horizontally or longitudinally on a frame 116ª, the latter being suspended by weighing mechanism which may be constructed and operative as shown in Figure 7. It will be understood that the feed conveyor 2ª will be driven by a motor connected to the shaft of one of its rolls, this motor being automatically controlled by the switch 82 associated with the dial mechanism incident to the weighing operations, that the mounting for the feed conveyor is tiltable and provided with a switch as shown in Figure 2 to cause stopping of the machine in the event the supply of material to the machine is interrupted or becomes unduly reduced and that the weighing conveyor 103ª is driven by an electric motor which is connected to the shaft of one of its supporting rolls. The upper stretches of the feed conveyor 2ª and the weighing conveyor 103ª travel toward the right in this figure, as in Figure 2. The longitudinal adjustment provided between the weighing conveyor and its scale supported frame 116ª enables the operation of the machine to be speeded up while employed for the weighing of relatively small quantities of material. During the weighing of relatively large charges, the material making up the charge will cover the major portion of the length of the weighing conveyor, and in that event, the weighing conveyor will occupy a position toward the right substantially as shown in Figure 10. However, in the weighing of small charges which require a relatively short length of the weighing conveyor, there would be relatively long idle intervals between the weighing of the charges if such charges were deposited on the left-hand end of the conveyor 103ª and carried to the right-hand end thereof before discharging, but by shifting the weighing conveyor toward the left in Figure 10 so that the material is deposited upon the middle or right-hand portion of this conveyor, the distance through which the charges must travel before discharging from the weighing conveyor is reduced, thus enabling the machine to operate more rapidly in the weighing of relatively small charges.

While it is generally preferable to arrange the feed and weighing conveyors one above the other and so that they run in parallel or substantially parallel paths because such an arrangement economizes floor space and affords other advantages which will be understood by those skilled in this art, it will be understood that, where desirable, the feed conveyor or conveyors may be arranged laterally at any angle so that they discharge the material to be weighed onto the weighing conveyor.

It will be understood that the means for automatically stopping the feed and weighing conveyors in the event the material on the feed conveyor becomes clogged or the operating parts of the machine become jammed or obstructed, or in the event the weighed charges discharged from the weighing conveyor accumulate at the discharge end thereof, may be applied to any of the embodiments of the invention herein shown, if the circumstances render the use of any or all of such means desirable or necessary.

In applying the automatic stopping means operative upon interruption or undue reduction in the supply of material, to the feed conveyors 102 and 102ª of Figure 8, the controlling switches would be connected in series with each other in a circuit such as that shown in Figure 13.

We claim as our invention:—

1. An automatic weighing machine comprising a conveyer having means for operating it continuously, weighing means supporting a portion at least of said conveyer, and a feed conveyer arranged to feed material to be weighed to said continuously operating conveyer and having means for advancing it intermittently under the control of the weighing means, whereby separate weighed charges of material are formed successively on said continuously operating conveyer.

2. An automatic weighing machine comprising a weighing conveyor having weighing mechanism supporting it and means for operating it continuously, and a feed conveyor arranged to deliver material to be weighed onto the weighing conveyor having means controlled by the weighing mechanism for operating the feed conveyor intermittently, whereby separate weighed charges of such material are formed and weighed on the weighing conveyor.

3. An automatic weighing machine comprising a scale supported weighing conveyor having means for operating it continuously, a feed conveyor for feeding material onto the weighing conveyor, and means controlled by the weighing movements of the weighing conveyor for operating the feed conveyor intermittently thereby causing the material fed to the weighing conveyor to form weighed charges thereon.

4. An automatic weighing machine comprising a scale supported weighing conveyor having means for operating it continuously, a feed conveyor for feeding material to be weighed onto the weighing conveyor, and means controlled by the weighing movements of the weighing conveyor for causing operation of the feed conveyor to feed material to the weighing conveyor while the latter contains less than a full weighed charge, for interrupting the operation of the feed conveyor when a full weighed charge has been made up thereon, and for again causing operation of the feed conveyor when part of the weighed charge has been discharged from the weighing conveyor.

5. An automatic weighing machine comprising a scale supported travelling weighing conveyor having means for operating it continuously, and a feed conveyor for feeding material to be weighed onto the weighing conveyor, the feed conveyor having means controlled by the weighing movements of the weighing conveyor for operating it intermittently whereby separate charges are successively made up and individually weighed on the weighing conveyor.

6. An automatic weighing machine comprising a travelling scale supported weighing conveyor having means for driving it continuously, a feed conveyor for feeding material onto the weighing conveyor, a motor for operating the feed conveyor, and an electric switch governed by the weighing movements of the weighing conveyor and controlling the operation of the feed conveyor by said motor in accordance therewith.

7. An automatic weighing machine comprising a travelling scale supported weighing conveyor having means for driving it continuously, a feed conveyor for feeding material onto the weighing conveyor, an electric motor for operating the feed conveyor, and a switch controlling said motor and governed by the weighing movements of the weighing conveyor.

8. An automatic weighing machine comprising an endless scale supported weighing conveyor having means for operating it continuously, an endless feed conveyor for feeding material onto the weighing conveyor, and means governed by the weighing movements of the weighing conveyor for causing operation of the feed conveyor while the weighing conveyor contains less than a full weight charge of material, for interrupting the operation of the feed conveyor when a full weight charge of material has been made up on the weighing conveyor, and for again starting the feed conveyor into operation after part of the weighed charge has been discharged from the weighing conveyor.

9. An automatic weighing machine comprising a conveyer having means for advancing it continuously, weighing means supporting a portion at least of said conveyer, a feed conveyer arranged to feed material to be weighed on to said continuously advancing conveyer, operating means for said feed conveyer, and controlling means for the feed conveyer operating means governed by the weighing means under the influence of a weighed charge of material on said continuously advancing conveyer for automatically stopping said feed conveyer and for automatically setting the feed conveyer into operation after the weighing means has been relieved of the influence of part at least of the weighed charge.

10. In a weighing machine, the combination of weighing means, including a conveyor, a feed conveyor for feeding thereto the material to be weighed, and means for automatically stopping said feed conveyor and weighing means before the normal supply of material thereto fails.

11. In a weighing machine, weighing means, including a conveyor, a feed conveyor for feeding thereto the material to be weighed, a tiltable mounting on which said feed conveyor is supported, a supply hopper for the feed conveyor also supported by said tiltable mounting, driving means for operating said conveyors, and controlling means for the weighing means and the feed conveyor driving means governed according to the amount of material in the supply hopper.

12. An automatic weighing machine comprising a weighing conveyor, a portion at least of which is scale-supported and having means for operating it continuously, a feed conveyor for supplying material to the weighing conveyor and having means controlled by the weighing movements of the weighing conveyor for operating it intermittently, and means governed according to the supply of material to the weighing conveyor for controlling the operation of the weighing and feed conveyors.

13. An automatic weighing machine comprising a scale supported weighing conveyor having means for operating it continuously, a feed conveyor for feeding material to the weighing conveyor, means governed by the weighing movements of the weighing conveyor for controlling the operation of the feed conveyor, and means governed in accordance with the supply of material to the feed conveyor for controlling the operation of both the feed and weighing conveyor.

14. In a weighing machine, the combination of a travelling feed conveyor for feeding material to be weighed, weighing means for weighing the material to form charges, and means controlled automatically by the weighing means to stop the feed conveyor when the weighing means fails to receive a full weight charge of material.

15. In a weighing machine, the combination of a weighing conveyor supported by weighing mechanism and having means for operating it continuously, a feed conveyor for feeding material thereto, means governed by the weighing mechanism for operating the feed conveyor, and means governed by the weighing mechanism to stop the operation of the weighing and feed conveyors when the weighing conveyor fails to receive a full weight charge of material.

16. In a weighing machine, the combination of a weighing conveyor supported by weighing mechanism and having means for operating it continuously, a feed conveyor for feeding material to the weighing conveyor, means governed by the weighing mechanism for intermittently operating the feed conveyor, and means governed by the depth of material on the weighing conveyor for controlling the operation of both the weighing conveyor and the feed conveyor.

17. In an automatic weighing machine, the combination of a weighing conveyor supported by weighing mechanism and having means for driving it continuously, a feed conveyor for feeding material to the weighing conveyor, means governed by the weighing mechanism for operating the feed conveyor intermittently to deposit successively charges of material on the weighing conveyor, a member which is displaceable during the passage of each charge on the weighing conveyor, means controlling the operation of the feed and weighing conveyors, and means governed by the weighing mechanism for causing the displacement of said member by a charge of less than full weight to actuate said controlling means to stop the operation of the feed and weighing conveyors.

18. In a weighing machine, the combination of a travelling conveyor to receive material to be weighed, driving means therefor embodying a coupling the members of which are normally connected by a driving connection adapted to be broken when an undue load is imposed upon it, a part cooperative with said coupling members and having means for setting it in actuated position when said driving connection is broken and relative rotation takes place between the coupling members, and means governed by said part and operative by it when in actuated position to stop the driving means.

19. In an automatic weighing machine, the combination of a weighing conveyor having driving means for operating it continuously, a feed conveyor for feeding material to the weighing conveyor, driving means governed by the weighing movements of the weighing conveyor for operating the feed conveyor intermittently, a device between one of said conveyors and its driving means adapted to be actuated when an undue load is imposed by such conveyor upon its driving means, and means controlled by said device for stopping the operation of both conveyors.

20. In an automatic weighing machine, the combination of weighing means, a plurality of feed conveyors having means for supplying different materials separately thereto, each being operative to feed material to be weighed to the weighing means, and means governed by the weighing means for causing one of said conveyors to operate until a predetermined proportion of a charge of one material has been fed by it to the weighing means and for then stopping the operation of said conveyor and causing another of said feed conveyors to operate to feed another predetermined proportion of a charge of another material to the weighing means.

21. In an automatic weighing machine, the combination of a weighing conveyor having means for operating it continuously, a plurality of feed conveyors having separate sources of supply of different materials and operative to feed different materials to be weighed to the weighing conveyor, and means governed by the weighing movement of the weighing conveyor to cause successive operations of said feed conveyors to feed predetermined proportions of a charge of different materials to the weighing conveyor.

22. In an automatic weighing machine, the combination of weighing means, a plurality of feed conveyors each operative to feed material to the weighing means, and controlling means governed in accordance with the weighing movements of the weighing means for causing successive operations of the feed conveyors to feed respectively predetermined proportions of a charge to the weighing means, said controlling means being variable to vary the proportions of the charge fed by the respective feed conveyors.

23. In a weighing machine, the combination of a travelling conveyor a portion at least of which is scale-supported for weighing and discharging weighed charges of material, and means controlled by the discharging weighed charges for automatically stopping the weighing conveyor when the charges accumulate at the discharge end thereof.

24. In a weighing machine, the combination of a travelling conveyor a portion at least of which is scale-supported for weighing and discharging weighed charges of material, a feed conveyor controlled by the weighing movements of the weighing conveyor and operative to feed material thereto, a hopper into which the charges are received successively from the weighing conveyor, and means operative in consequence of the presence of an abnormal amount of material in said hopper for stopping the operation of the weighing and feed conveyors.

In testimony whereof we have hereunto set our hands.

HENRY RICHARDSON.
STANLEY G. MURRAY.